Aug. 4, 1931. E. O. BENNETT Re. 18,147

CROWN BLOCK

Original Filed Dec. 11, 1923 2 Sheets-Sheet 1

INVENTOR:
Edwin O. Bennett,
BY Fred W. Lanier
ATTORNEY.

Aug. 4, 1931. E. O. BENNETT Re. 18,147

CROWN BLOCK

Original Filed Dec. 11, 1923 2 Sheets-Sheet 2

INVENTOR:
Edwin O. Bennett,
BY Fad A. Rowe
ATTORNEY.

Reissued Aug. 4, 1931

Re. 18,147

UNITED STATES PATENT OFFICE

EDWIN O. BENNETT, OF PONCA CITY, OKLAHOMA, ASSIGNOR, BY DIRECT AND MESNE ASSIGNMENTS, OF ONE-HALF TO EMSCO DERRICK & EQUIPMENT COMPANY, A CORPORATION OF CALIFORNIA, AND ONE-HALF TO THE NATIONAL SUPPLY COMPANY, OF TOLEDO, OHIO, A CORPORATION OF OHIO

CROWN BLOCK

Original No. 1,673,346, dated June 12, 1928, Serial No. 679,917, filed December 11, 1923. Application for reissue filed January 2, 1929. Serial No. 329,858.

This invention relates to oil well drilling equipment and relates particularly to the arrangement of sheaves placed at the top of the derrick to form a block for the hoisting of ropes and cables.

In the present form of well drilling equipment, a crown block is employed which is equipped with an arrangement of sheaves whose axes are parallel to the axes of rotation of the band wheel, the bull wheel, and the calf wheel. The opening in which the crown block is placed is generally five feet square and the sheaves are distributed through this area, certain of these sheaves being devoted to different purposes; some of them being arranged to receive the separate turns of rope from a suspended multiple sheave tackle block and other of the sheaves being adapted to receive hoisting ropes such as the sand line and cat line. With the arrangement now employed, the tackle sheaves are separated a considerable distance apart, thus causing the ropes to diverge as they extend upwardly from the suspended tackle block in which the sheaves are placed close together.

With this arrangement of rigging the tackle block, the height to which the suspended block may be lifted ranges between five and ten feet less than the height of the crown block from the derrick floor, owing to the acute angular divergence of the cables when the suspended member is in raised position. This angular disposal of the tackle ropes has the tendency of causing the outer ropes to come off the outer sheaves of the crown block if care is not exercised in limiting the height to which the suspended block is raised. A particular disadvantage in the present type of crown block is that the various rope sheaves are not centralized with the vertical axis of the derrick and therefore the pull exerted by hoisting ropes is not concentric with the well casing which is situated substantially in the center of the derrick floor.

It is an object of the invention to provide a crown block in which the single rope sheaves such as employed for light hoisting are radially disposed relative to the central axis of the derrick and are so positioned that the ropes extend downwardly in the center of the derrick.

It is a further object of the invention to provide a stationary tackle sheave arrangement consisting of sheaves which are arranged close together so that the ropes from the suspended tackle block will be substantially vertical and parallel throughout all the positions of the suspended member, thus permitting the raising of the movable block to the extreme top of the derrick.

It is a further object of the invention to provide a stationary tackle sheave arrangement which is mounted above the single rope sheaves and is so arranged that the ropes which extend downwardly therefrom will clear the lower sheaves and the supporting members. This stationary tackle sheave arrangement is also centralized with the axis of the derrick so that the suspending block will hang in position directly above the well opening.

In districts where rotary drilling is extensively practiced, the rotary draw works or driving gear is placed in a position to the side of the bull wheel and calf wheel. This placement of the draw works brings the axis of rotation of the draw works drum on a plane perpendicular to the rotational axes of the sheaves in the crown block. It is customary to lift heavy weights such as casing and drill pipe from the draw works by use of the multiple rope tackle. In accomplishing this with the present form of crown block, the end rope which leads to the draw works drum is carried angularly from the end crown block sheave which causes rapid wear on the flange of the sheave and also considerable wear on the cable. When the flange has become worn down due to the wearing action of the rope, breakage occurs causing the rope to ride off the sheave and to become caught in the crown block structure, causing considerable delay and often injuring the cable.

In my invention, the stationary tackle sheave arrangement is disposed above the single rope sheaves and with its axis of rotation parallel to the axis of rotation of the rotary draw works drum, thus placing the axis of the stationary tackle sheave arrangement perpendicular to the axes of the lower sheaves. By this construction, side pull on the sheave flanges is eliminated and the excessive wear resulting therefrom is obviated.

The especial advantages and further objects of the invention will be made evident hereinafter.

Referring to the drawings which are for illustrative purposes only:

Figure 1:
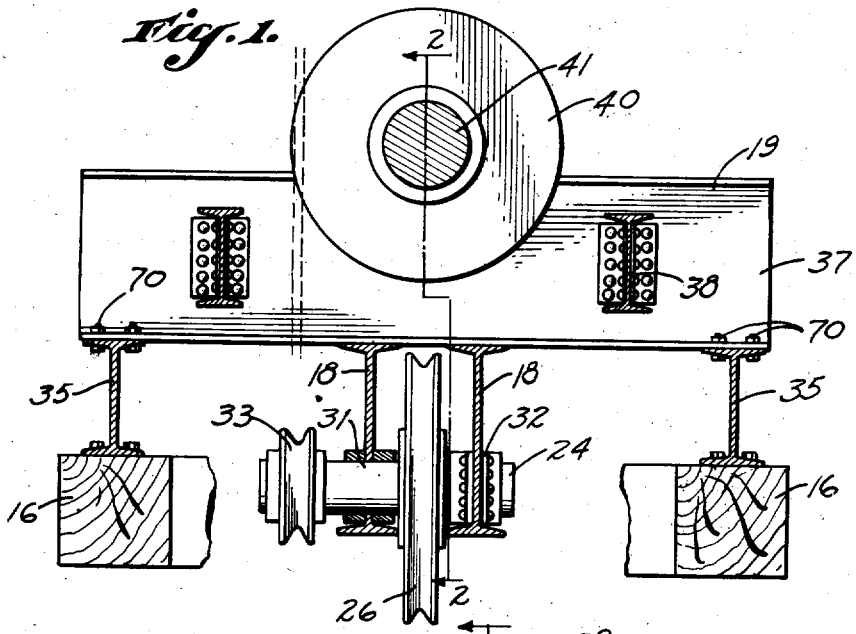
Fig. 1 is a vertical section through a crown block embodying the features of my invention, this section being taken as indicated by the line 1—1 of Fig. 2.
Figure 2:
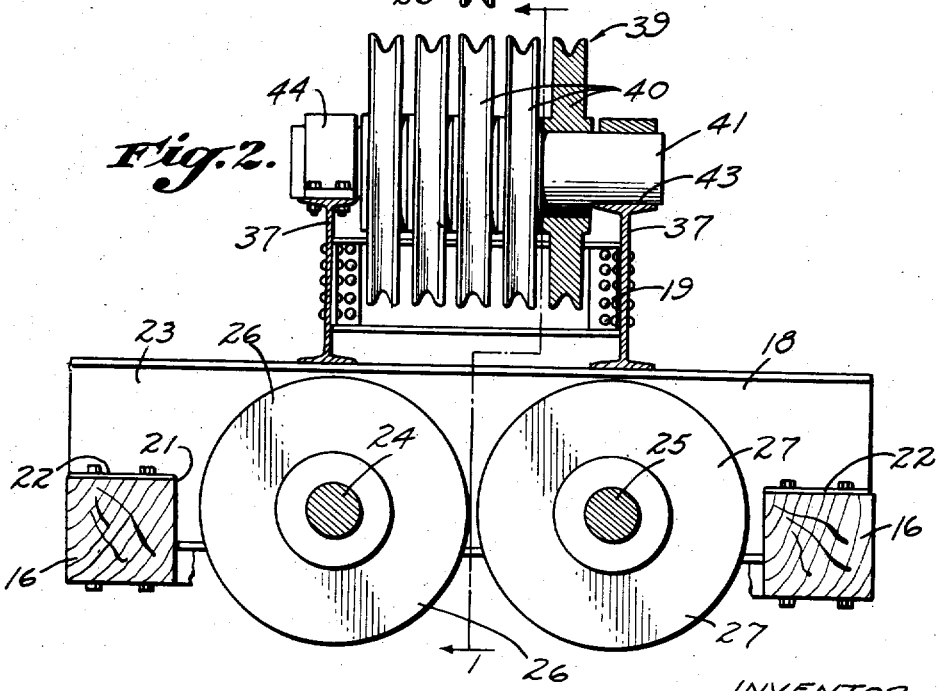
Fig. 2 is a vertical section taken as indicated by the line 2—2 of Fig. 1.
Figure 3:
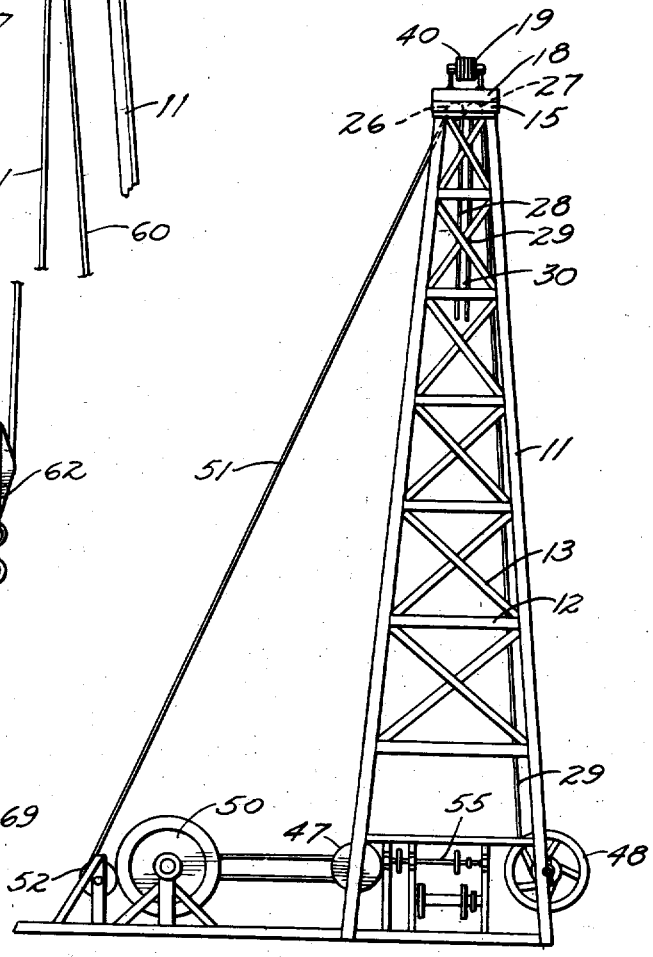
Fig. 3 is a diagrammatic view showing the crown block in use on a derrick.

As shown in Fig. 3 of the drawings, it is customary to employ in the construction of a drilling derrick four inwardly sloping legs 11 which are interconnected and braced by girts 12 and struts 13. At the top of the structure is a square frame work commonly termed the water table 15, consisting of water table beams 16 which define a substantially square opening at the top of the derrick and in which the crown block is customarily placed. As shown in Figs. 1 and 2, my crown block consists of a lower frame work 18 and an upper frame work 19, which are horizontally disposed. The lower frame work 18 preferably employs a pair of beam members which are equipped for securement to the water table beams 16.

In wood derrick construction, these water table beams generally consist of 12 x 12 timbers and the beams 18 are notched at the ends as indicated at 21 so that the central portion of the beams will extend down into the water table opening. Flanges 22 are secured to the webs 23 of the beams either by welding or by the use of clips to provide ample bearing on the water table beams 16. The beams 18 are placed fairly close together and support therebetween on shafts 24 and 25 the lower sheaves 26 and 27, these sheaves being disposed in the same vertical plane and being located on each side of the central axis of the derrick so that when ropes or cables 28 and 29 are run thereover, the downwardly extended portions thereof hang substantially in the center of the derrick as shown at 30 in Fig. 3. The shafts 24 and 25 extend through openings 31 in the webs 23 of the beams 18 and are supported in bearing blocks 32. The leftward end of the shaft 24 as shown in Fig. 1 is extended sufficiently to receive a small sheave 33.

In view of the fact that it is preferable to employ a large diameter sheave in the positions 26 and 27 so that the bend of the cable or rope will not be acute, the sheaves 26 and 27 may be 30 inches in diameter which would require a beam 18 of substantially 20 inches in depth.

In positions parallel to the beams 18, beams 35 are placed on the water table beams as shown in Fig. 1, and across the top of the beams 18 and 35 is placed the upper frame work consisting of beams 37 and bracing members 38. These beams 37 are separated at a distance to accommodate the number of sheaves 40 which are arranged upon a shaft 41 to form a stationary tackle sheave arrangement 39. In the drawings, five sheaves 40 are shown, it being understood that a greater or lesser number may be employed as the conditions may require. The shaft 41 is flattened at the ends thereof as indicated at 43 to provide a stable bearing upon the upper flanges of the beams and is secured in place by U clamps 44. The beams 37 are disposed at right angles to the beams 18 and 35 thus disposing the sheaves 40 crosswise relative to the sheaves 26 and 27. As shown in Fig. 3, the sheaves 26 and 27 are aligned with the calf wheel 47 and bull wheel 48 which in turn are arranged to be driven from the band wheel 50. The sheave 26 may be employed to receive a rope from the calf wheel or may receive the sand line which is wound upon the sand reel 52. The bull wheel 48 is employed to receive the cable 29 which extends over the sheave 27.

Figure 4:
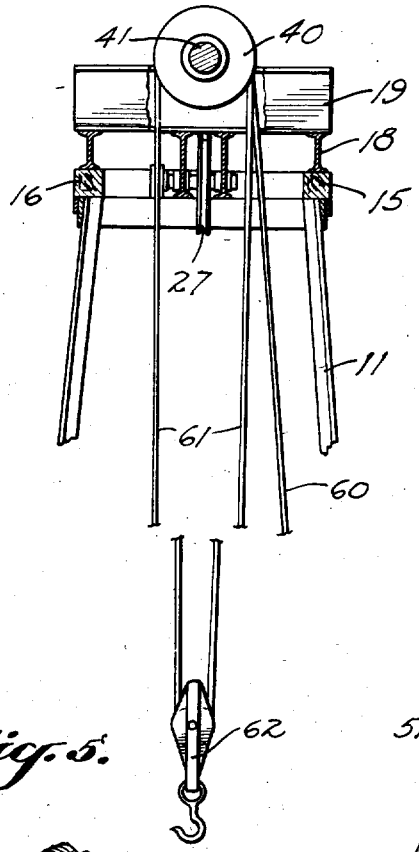
Fig. 4 is a fragmentary sectional view showing the manner of rigging the block and tackle.

The rotary draw works 55 indicated in Fig. 3 is placed to the side of the bull wheel and calf wheel and the rotational axes of the rotating parts of the rotary draw works lie parallel to a vertical plane which is perpendicular to the axes of rotation of the calf wheel and bull wheel. The stationary tackle sheave arrangement 39 being disposed crosswise of the sheaves 26 and 27, rotates in plane with the rotary draw works so that the rope 60 in Fig. 4 will extend directly down to the draw works and will not be drawn from the end sheave of the tackle block at an angle which will cause wear on one of the sheave flanges. As shown in Fig. 4, the ropes 61 which extend from the sheaves 40 to the suspended stationary tackle sheave arrangement 62 pass downwardly upon each side of the sheaves 26 and 27 and the beams 18, thus centralizing the suspended block 62 directly above the well which is being drilled.

It will be recognized that in the arrangement of sheaves employed in my device, all of the separate hoisting members which are to operate through the well casing, fall centrally within the derrick. This feature is particularly valuable as thereby much effort is saved due to relief of the necessity of guiding the lifted members concentrically within the derrick.

Figure 5:
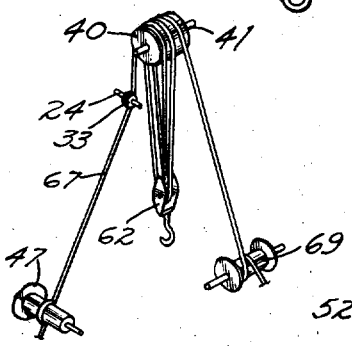
Fig. 5 is a diagrammatic perspective view showing the manner in which the idler sheave may be employed.

As shown in Fig. 5, the sheave 33 being upon the shaft 24 extends in a plane relatively perpendicular to the end sheave 40 of the stationary tackle sheave arrangement 39 so that one end of the rope indicated at 60 in Fig. 4 may be extended down to the drum of the calf wheel 47 as indicated at 67, this rope extending over the sheave 33 in the manner shown, thus preventing a side pull on the flange of the end sheave 40. This arrangement is particularly desirable in the handling of casing and drill pipe as a precaution against sticking of the pipe or casing due to stoppage of the rotary draw works resulting from breakage, as sometimes occurs. In case of trouble in the draw works, the casing may be kept in motion, through the winding of the end of the rope which extends to the calf wheel, which calf wheel is driven from the band wheel which has a power source entirely separate from the rotary draw works. In Fig. 5, the relative disposal of the shafts 24 and 41, the calf wheel 47 and the drum 69 of the draw works 55 is shown, thus plainly indicating the cooperation between the separate sheaves and the separate drums with which they are employed.

Although but two sheaves 26 and 27 are shown in the lower frame work, it is to be understood that other sheaves may be supported therein for promiscuous hoisting duty as desired, without departing from the principles of the invention.

A very important feature of the invention resides in the removability of the upper frame 19 which carries the stationary tackle sheave arrangement from the lower frame 17 by merely removing bolts 70. The heavy strains encountered in rotary drilling due to the heavy weight of the pipe and casing which must be carried requires a massive construction of the stationary tackle sheave arrangement. After the casing has been set and the well placed in production, need for heavy lifting is past. The sheaves carried in the lower frame work 17 are ample for the handling of tubing and the ordinary lifting which is to be done around a producing well. The stationary tackle sheave arrangement 39 therefore may be removed and employed in the drilling of another well, this removal of the stationary tackle sheave arrangement being accomplished without difficulty or without dismantling of the permanent members of the crown block.

I claim as my invention:

1. In a crown block construction for oil derricks, the combination of: a pillow block; a pair of lower sheaves mounted to rotate about different axes in said pillow block; a pair of brackets extending upward from said pillow block; and a plurality of upper sheaves mounted to rotate between said brackets about a single axis disposed substantially at right angles to the axes of said lower sheaves.

2. In a crown block construction, the combination of: a frame work; two lower horizontal parallel shafts supported in said frame work; two lower sheaves, each mounted to turn about the axis of one of said shafts, said sheaves being situated in the same vertical plane and on opposite sides of the center of the derrick; and a small lead-off sheave also mounted on one of said lower shafts.

3. In a crown block construction, the combination of: a frame work; two lower horizontal parallel shafts supported in said frame work; two lower sheaves, each mounted to turn about the axis of one of said shafts; and a small lead-off sheave also mounted on one of said lower shafts.

4. In a crown block construction, the combination of: a frame work; two lower horizontal parallel shafts supported in said frame work; two lower sheaves, each mounted to turn about the axis of one of said shafts, said sheaves being situated in the same vertical plane and on opposite sides of the center of the derrick; a small lead-off sheave also mounted on one of said lower shafts; upper members mounted in said frame; an upper shaft supported in said upper members and extending in a direction substantially at right angles to said lower shafts in a horizontal plane substantially parallel to the plane of said lower shafts; and a plurality of upper sheaves mounted on and turning freely about the axis of said upper shaft.

5. In a crown block construction, the combination of: a frame work; two lower horizontal parallel shafts supported in said frame work; two lower sheaves, each mounted to turn about the axis of one of said shafts; a small lead-off sheave also mounted on one of said lower shafts; upper members mounted in said frame; an upper shaft supported in said upper members and extending in a direction substantially at right angles to said lower shafts in a horizontal plane substantially parallel to the plane of said lower shafts; and a plurality of upper sheaves mounted on and turning freely about the axis of said upper shaft.

In testimony whereof I have hereunto set my hand at Ponca City, Kay County, Oklahoma, this 10th day of Dec, 1928.

EDWIN O. BENNETT.